(12) United States Patent
Hammer

(10) Patent No.: US 7,677,506 B1
(45) Date of Patent: Mar. 16, 2010

(54) TRUCK AIR HOSE HOLDER

(76) Inventor: Douglas A. Hammer, 1776 Winterhaven Rd., Fallbrook, CA (US) 92028

(*) Notice: Subject to any disclaimer, the term of this patent is extended or adjusted under 35 U.S.C. 154(b) by 20 days.

(21) Appl. No.: 12/150,976

(22) Filed: May 2, 2008

(51) Int. Cl.
*E21F 17/02* (2006.01)
(52) U.S. Cl. .......................... 248/58; 248/68.1; 248/89
(58) Field of Classification Search .................. 248/62, 248/63, 58, 61, 67.5, 74.4, 89, 68.1
See application file for complete search history.

(56) References Cited

U.S. PATENT DOCUMENTS

| | | | | |
|---|---|---|---|---|
| 887,578 | A * | 5/1908 | Beyer | 248/58 |
| 2,791,255 | A * | 5/1957 | Ogden | 294/143 |
| 2,990,865 | A * | 7/1961 | Steele | 211/70.2 |
| 3,650,545 | A | 3/1972 | Freed | |
| 4,317,477 | A * | 3/1982 | Baptista | 294/137 |
| 4,358,082 | A | 11/1982 | Reeves | |
| 4,486,044 | A * | 12/1984 | Gordon et al. | 294/31.2 |
| 4,500,128 | A * | 2/1985 | McClure | 294/146 |
| 5,755,477 | A * | 5/1998 | McKnight | 294/146 |
| 5,909,861 | A | 6/1999 | Korson | |
| 6,902,180 | B2 | 6/2005 | Baginski | |
| 7,086,659 | B2 | 8/2006 | Baginski | |

* cited by examiner

*Primary Examiner*—Amy J. Sterling
(74) *Attorney, Agent, or Firm*—Loyal McKinley Hanson

(57) ABSTRACT

An apparatus for holding a plurality of rearwardly extending coiled lines on a truck in an elevated side-by-side position for line-protection purposes includes an assembly having a first section, a second section, and components for holding the assembly together. A plurality of at least two line-gripping portions (preferably three) extend away from the elongated portion radially relative to the axis of elongation and in spaced-apart relationship to each other. The line-gripping portions define line-receiving openings with central axes extending intermediate the first and second sections generally parallel to the axis of elongation. So constructed, the apparatus provides sidewardly extending openings for receiving upwardly disposed and sidewardly extending loop portions of the rearwardly extending coiled lines.

13 Claims, 4 Drawing Sheets

TRUCK AIR HOSE HOLDER

BACKGROUND OF THE INVENTION

1. Technical Field

This invention relates generally to the field of truck accessories, and more particular to an apparatus for supporting air hoses, cables, and/or other flexible lines extending between a truck cab and the trailer it is towing.

2. Description of Related Art

Motor vehicle laws and regulations and good trucking practice make it wise to support flexible lines (e.g., air hoses) that extend between a truck cab and the trailer it is towing. That is done to avoid the damage that might otherwise occur when the hoses rub together or against some truck structure for extended periods. U.S. Pat. No. 3,650,545, for example, describes one well known and commonly used flexible-line support system for doing so. It includes a two-section clamping unit (i.e., a truck air hose holder) that defines multiple, spaced-apart, line-receiving openings through which the air hoses extend. A user first assembles the two sections of the clamping unit over the rearwardly extending air hoses with a U-bolt and then connects the U-bolt to a supportive bar on the cab with a long spring. That way, the air hoses are supported flexibly in an elevated position while being held apart from each other.

One problem, however, is that the clamping unit works better with straight air hose line than it does with the coiled air hoses that have come into common usage since the invention of the prior art clamping unit. Assembling the clamping unit over coiled air hoses can be relatively more difficult and time consuming. Among other things, the user must deform the coiled air hoses significantly so that they align with the forwardly facing openings in the clamping unit. The user must then position the two separate clamping unit sections over the deformed air hoses and hold them together while adding the U-bolt and the U-bolt nuts. That entire procedure can be somewhat difficult, time-consuming and frustrating, with the resulting assembly often presenting a displeasing make-shift appearance. Thus, a need exists for a truck air hose holder (i.e., a clamping unit) that overcomes these drawbacks.

SUMMARY OF THE INVENTION

In view of the foregoing, it is an object of the present invention to provide a truck air hose holder that works better with coiled lines on a truck in order to thereby alleviate the foregoing concerns. The present invention achieves this objective by realizing that rearwardly extending coiled lines on a truck form loops such that each loop has an upwardly disposed loop portion that extends generally sideways on the truck (i.e., sidewardly) instead of rearwardly. Predicated on that realization, the invention provides a clamping unit having multiple line-receiving openings such that each opening faces sidewardly (i.e., extends sidewardly) rather than rearwardly. As a result, the line-receiving openings mate better with the upwardly disposed and sidewardly extending loop portions of the coiled loops. Assembly is easier, less time-consuming, and less frustrating, and the supported lines appear more neatly arranged.

To paraphrase some of the more precise language appearing in the claims and further introduce the nomenclature used, the invention provides an apparatus for holding a plurality of rearwardly extending coiled lines on a truck in an elevated side-by-side relationship for line-supporting purposes. The apparatus takes the form of an assembly having a first section, a second section, and means for holding the first and second sections together to form the assembly (e.g., nut-and-bolt combinations that extend through the first and second sections). To use the apparatus, a user assembles the two sections over the coiled air lines to be supported.

The assembly includes an elongated portion that extends along an axis of elongation. It also includes a plurality of at least two (preferably three) line-gripping portions (or "fingers") that extend away from the elongated portion radially relative to the axis of elongation and in spaced-apart relationship to each other. The line-gripping portions define line-receiving openings that extend along central axes. According to a major aspect of the invention, the central axes extend intermediate the first and second sections generally parallel to the axis of elongation. That orientation results in the apparatus providing sidewardly facing (i.e., sideways extending) openings for receiving the upwardly disposed and sidewardly extending loop portions of the rearwardly extending coiled lines.

One preferred embodiment includes three line-gripping portions (i,e., fingers) that define three line-receiving openings. In addition, the elongated portion of the assembly includes a loop on which a user can hook a supportive spring. One decorative embodiment is composed of chrome-plated or stainless steel for truckers who take great pride in vehicle appearance. Another less expensive embodiment is composed of plastic.

Thus, the invention provides a truck air hose holder that works better with coiled lines. Assembly is easier, less time-consuming, and less frustrating, and the supported lines appear more neatly arranged. The following illustrative drawings and detailed description make the foregoing and other objects, features, and advantages of the invention more apparent.

DESCRIPTION OF THE PREFERRED EMBODIMENTS

Figure 1:
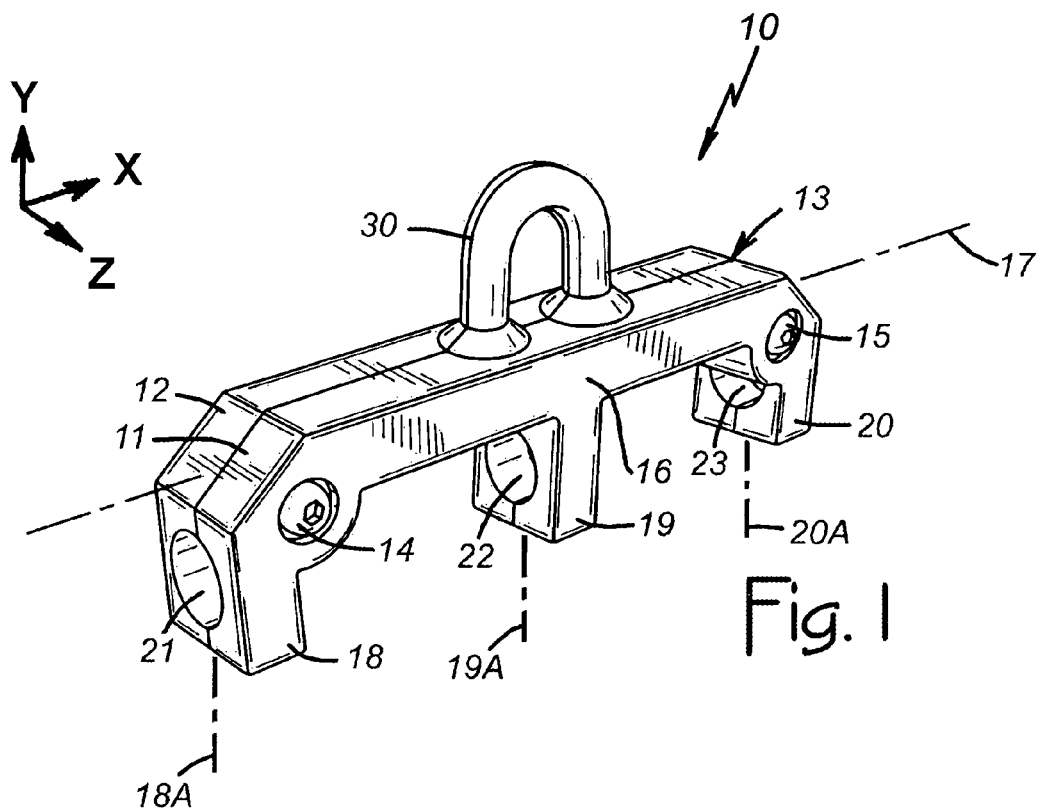
FIG. 1 of the drawings is perspective view of a truck air hose holder constructed according to the invention, with an X-Y-Z Cartesian coordinate system included for spatial orientation references.
Figure 2:
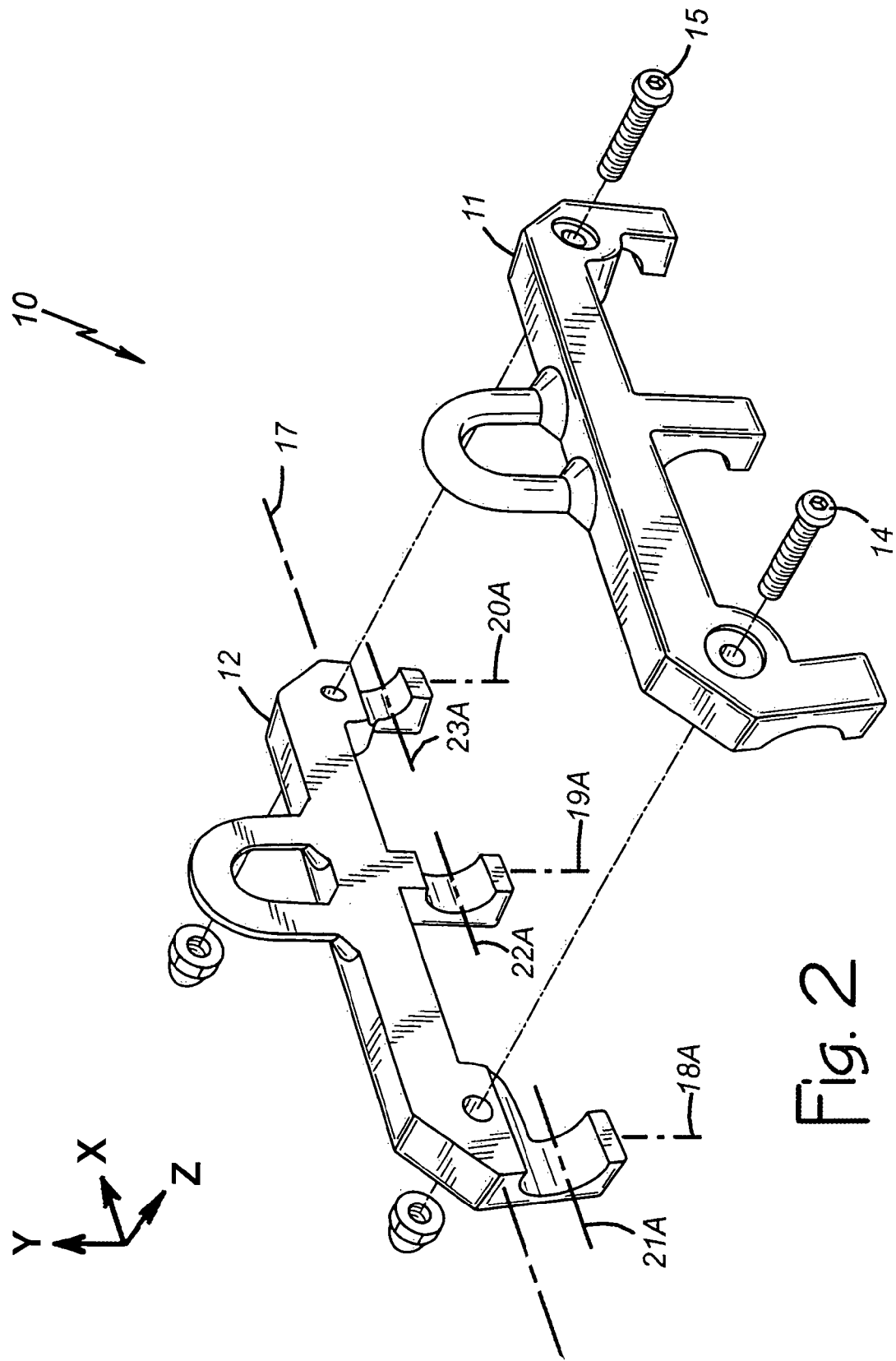
FIG. 2 of the drawings is an exploded view of the truck air hose holder.
Figure 3:
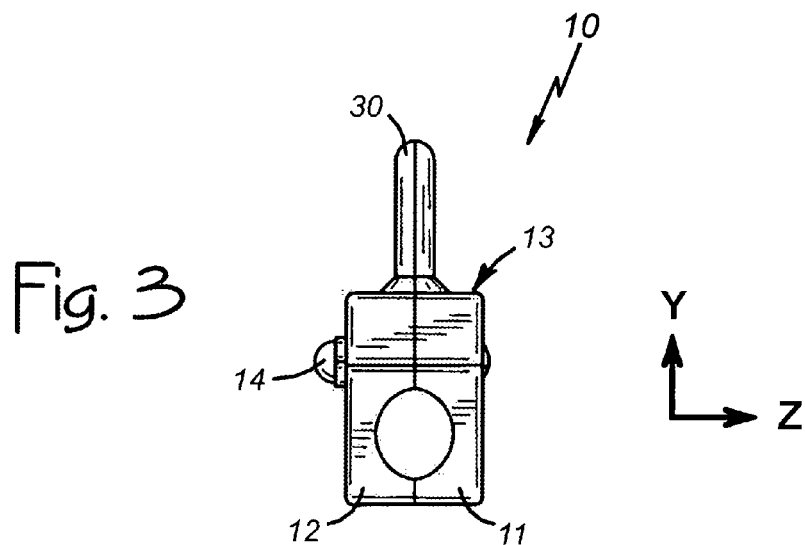
FIG. 3 is an enlarged side elevation view.

FIGS. 1, 2, 3, 4, and 5 of the drawings show various aspects of a truck air hose holder 10 constructed according to the invention. Generally, the air hose holder 10 includes first and second sections 11 and 12 that are assembled together to form an assembly 13 (FIGS. 1, and 3). The assembly 13 includes nut-and-bolt combinations 14 and 15 (FIGS. 1, 2, and 4) that extend through the first and second sections 11 and 12 to hold them together as the assembly 13. A user assembles those components over three coiled lines on a truck for purposes of supporting the lines as explained later on in this description with reference to FIG. 5.

Figure 4:
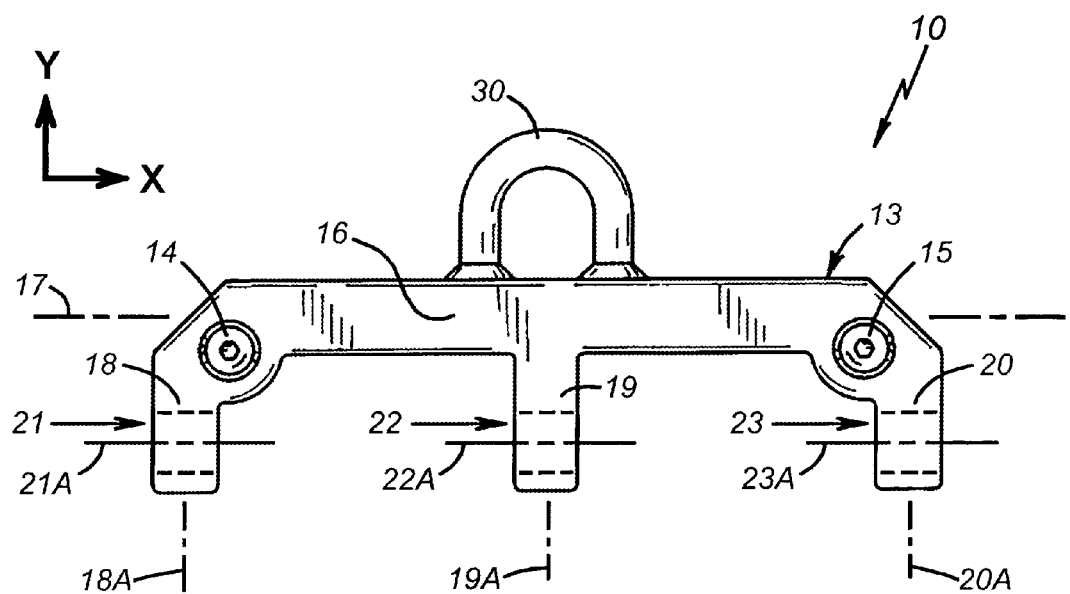
FIG. 4 is an enlarged front elevation view.

The assembly 13 includes an elongated portion 16 (i.e., an elongated finger-portion-supporting cross-piece portion) that extends along an axis of elongation 17 that is parallel to the X axis of the X-Y-Z Cartesian coordinate system (FIGS. 1, 2, and 4). The assembly 13 also includes three line-gripping portions 18, 19, and 20 (FIGS. 1 and 4) that extend away from the elongated portion 16 radially relative to the axis of elongation 17 and in spaced-apart relationship to each other (i.e., downwardly depending line-gripping finger portions). Each of the line-gripping portions 18, 19, and 20 extends along a respective one of axes 18A, 19A, and 20A shown in FIGS. 1, 2, and 4. Those axes are generally perpendicular to the axis of elongation 17, the term "generally perpendicular" including anywhere within about forty-five degrees of exactly perpendicular to the X-Z plane.

The first line-gripping portion 18 defines a first line-receiving opening 21 (FIGS. 1 and 4) that extends along a first central axis 21A shown in FIGS. 2 and 4. Similarly, the second line-gripping portion 19 defines a second line-receiving opening 22 (FIGS. 1 and 4) that extends along a second central axis 22A (FIGS. 2 and 4). The third line-gripping portion 20 defines a third line-receiving opening 23 (FIGS. 1 and 4) that extends along a third central axis 23A (FIGS. 2 and 4). Those three central axes are generally parallel to the axis of elongation 17, the term "generally parallel" including anywhere within about twenty degrees of exactly parallel to the X-Z plane.

Although the illustrated air hose holder 10 has three line-gripping portions 18, 19, and 20 that define three line-receiving openings 22, 23, and 24, a unit having just two line-gripping portions falls within the broader scope of the invention. Thus, in terms of the claim language, an apparatus constructed according to the invention for holding a plurality of at least two rearwardly extending coiled lines on a truck in elevated side-by-side positions for line-protection purposes comprises a two-section assembly that includes a plurality of at least two line-gripping portions. A first line-gripping portion of the two defines a first line-receiving opening extending along a first central axis. A second line-gripping portion of the two defines a second line-receiving opening extending along a second central axis. The first and second central axes extend intermediate the first and second sections of the assembly generally parallel to the axis of elongation.

Figure 5:
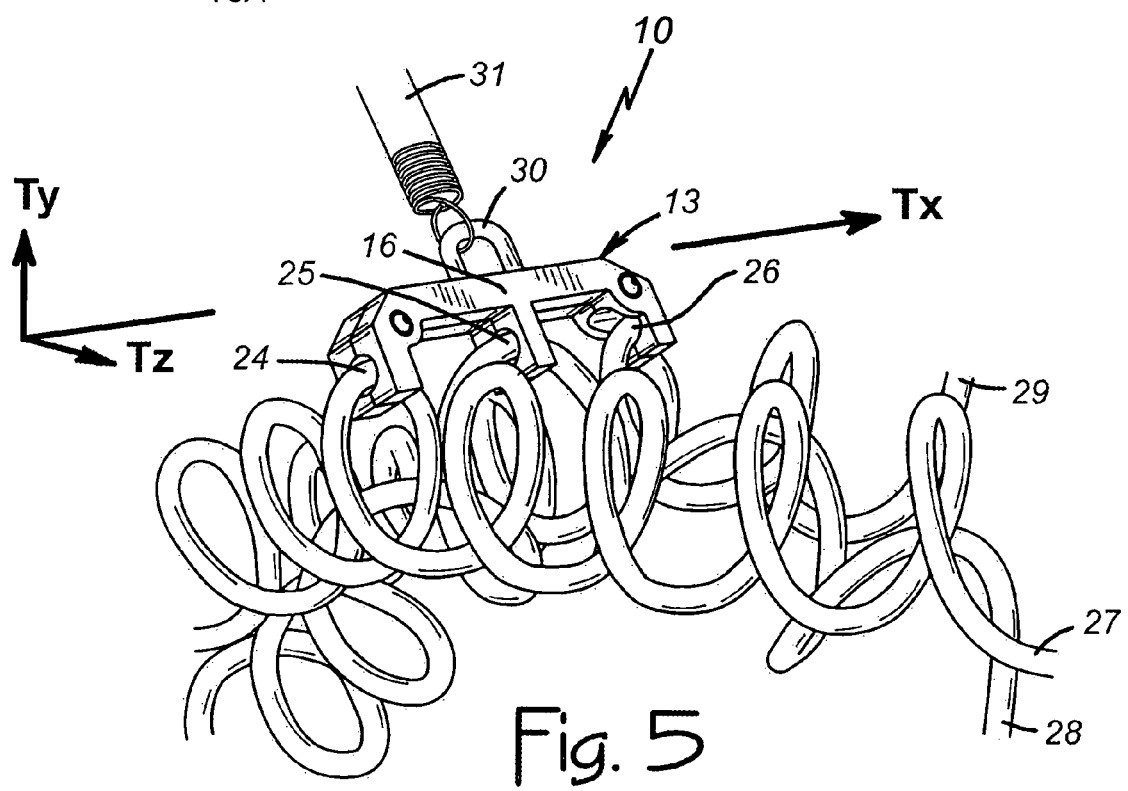
FIG. 5 is a perspective view of the truck air hose holder assembled over three coiled air hoses on a truck.

For the illustrated three-line air hose holder 10, each of the three line-gripping portions 18, 19, and 20 functions as means for gripping a respective one of three upper loop portions 24, 25, and 26 of three loops portions of three rearwardly extending coiled lines 27, 28, and 29 on a truck (FIG. 5). A truck is not shown in FIG. 5, but the truck X axis is depicted by a line labeled Tx in FIG. 5, while the truck Y axis is depicted by a line labeled Ty and the truck Z axis is depicted by a line labeled Tz. As such, Tx extends horizontally and crossways (sideways) across the truck from the left side of the truck to the right side of the truck, Ty extends vertically, and Tz extends horizontally and rearwardly from the front of the truck to the rear of the truck. The three rearwardly extending coiled lines 27, 28, and 29 extend rearwardly on the truck (i.e., parallel to Tz), while the three upper loop portions 24, 25, and 26 extend sidewardly on the truck (i.e., parallel to Tx).

The elongated portion 16 of the assembly 13 includes a loop 30 (FIGS. 1-4) that functions as means for connecting the assembly 13 to a separate supportive spring 31. Other connecting means may be included instead. After assembling the assembly 13 over the sideways extending upper portions 24, 25, and 26 of the three coiled lines 27, 28, and 29, as shown in FIG. 5, the user hooks a first end of the spring 31 onto the loop 30 and a second end (not shown) of the spring 31 onto truck structure (not shown) that is elevated relative to the coiled lines 27, 28, and 29. That way, the spring 31 supports the assembly 13, with the tree line-gripping portions 24, 25, and 26 supporting the three lines 27, 28, and 29 and with the axis of elongation 17 disposed generally parallel to Tx.

As an idea of size, the elongated portion 16 of the illustrated truck air hose holder 10 is about 7.0 inches to 8.0 inches in overall length measured parallel to the axis of elongation 17. The overall height of the assembly 13, less the loop 30, is about 2.5 inches to 3.0 inches measured perpendicular to the axis of elongation 17. The loop 30 is about 1.0 inch to 1.5 inches high beyond the rest of the elongated portion 16, and the line-receiving openings 21, 22, and 23 are about 0.5 inch to 0.75 inch in diameter in order to easily receive flexible lines having outside diameters slightly less than that. The drawings are approximately to scale so that other dimensions can be estimated relative to those given above. Of course, all the dimensions may vary significantly within the scope of the claims and without departing from the inventive concepts disclosed. Based upon the foregoing and subsequent descriptions, one of ordinary skill in the art can readily implement an apparatus according to the invention using any of various materials, including metal (e.g., chrome-plated or stainless steel) and plastic.

Figure 6:
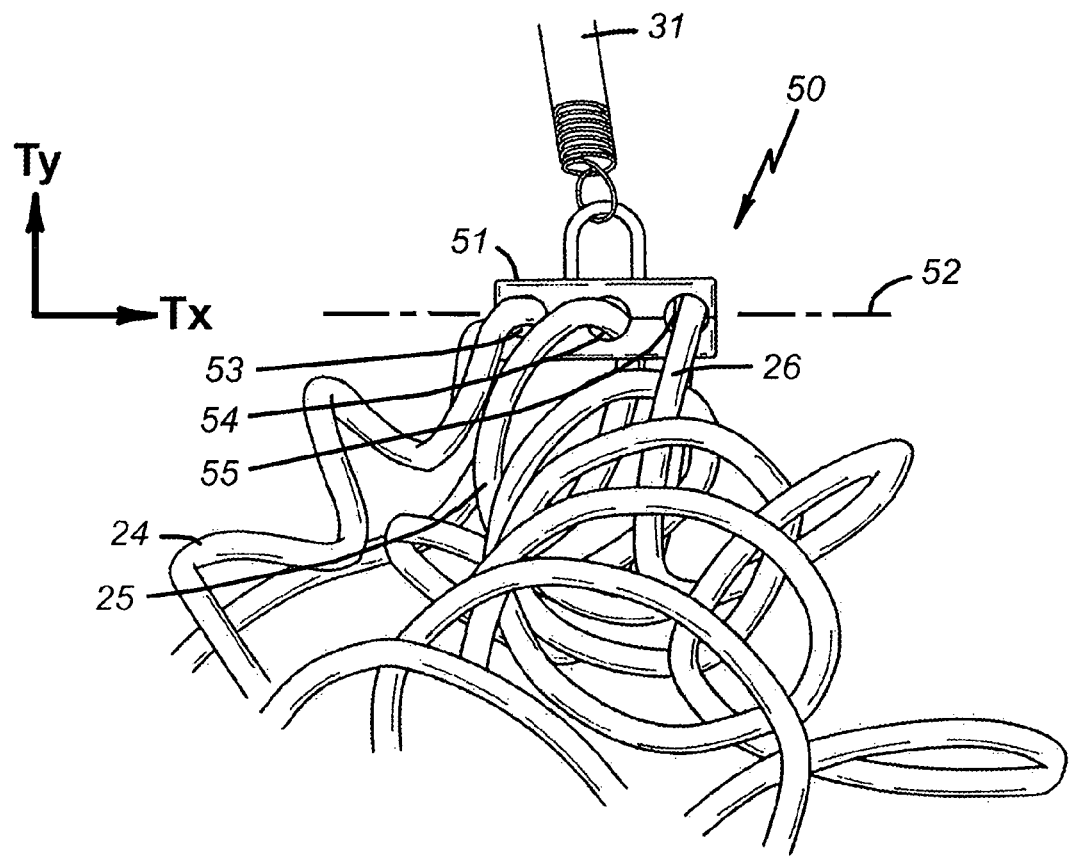
FIG. 6 is a perspective view of a prior art clamping unit assembled over the three coiled air hoses.

Turning now to FIG. 6, it shows a prior art clamping unit 50 being used with the spring 31 to hold the three coiled lines 24, 25, and 26. The unit 50 includes an elongated portion 51 that extends along an axis of elongation 52 (shown parallel to the truck X axis, Tx). The elongation portion 51 defines three line receiving openings 53, 54, and 55 that face rearwardly instead of sidewardly. The user must distort the three coiled lines 24, 25, and 26 in order to assemble the unit 50 over them.

Thus, the invention alleviates some concerns associated with the prior art. Assembly is easier, less time-consuming, and less frustrating, and the supported lines appear more neatly arranged. Although an exemplary embodiment has been shown and described, one of ordinary skill in the art may make many changes, modifications, and substitutions without necessarily departing from the spirit and scope of the invention. As for the specific terminology used to describe the exemplary embodiment, it is not intended to limit the invention; each specific term is intended to include all technical equivalents that operate in a similar manner to accomplish a similar purpose or function.

What is claimed is:

1. An apparatus for holding a plurality of at least two rearwardly extending coiled lines on a truck in elevated side-by-side positions for line-protection purposes, the apparatus comprising:

an assembly having a first section, a second section, and means for holding the first and second sections together;

said first and second sections cooperating to form an elongated finger-portion-supporting cross-piece portion of the assembly that extends along an axis of elongation; and said first and second sections cooperating to form a plurality of at least two line-gripping finger portions of the assembly each having generally planar opposite surfaces that extend away from the elongated finger-portion-supporting cross-piece portion in a common direction and in spaced-apart relationship to each other, including a first line-gripping finger portion that defines a first line-receiving opening extending along a first central axis and a second line-gripping finger portion that defines a second line-receiving opening extending along a second central axis;

wherein the first central axis and the second central axis extend intermediate the first and second sections generally parallel to the axis of elongation;

thereby providing an apparatus having downwardly depending, spaced apart finger portions that define sidewardly extending openings for receiving upwardly disposed and sidewardly extending loop portions of the plurality of at least two rearwardly extending coiled lines without subjecting the coiled lines to damage caused by rubbing against structure disposed intermediate the sidewardly extending openings.

2. An apparatus as recited in claim 1, wherein the plurality of at least two line-gripping finger portions of the assembly includes at least three line-gripping portions that define three line-receiving openings.

3. An apparatus as recited in claim 1, wherein the means for holding the first and second sections together includes a plurality of nut-and-bolt combinations extending through the first and second sections.

4. An apparatus as recited in claim 1, further comprising means for connecting the assembly to a separate supportive spring.

5. An apparatus as recited in claim 4, wherein the means for connecting the assembly to a separate supportive spring includes a portion of the elongated finger-portion-supporting cross-piece portion that forms a loop on which a user can hook the spring.

6. An apparatus as recited in claim 1, wherein the first and second sections are composed of metal.

7. An apparatus as recited in claim 1, wherein the first and second sections are composed of plastic.

8. An apparatus for holding a plurality of at least three rearwardly extending coiled lines on a truck in an elevated side-by-side position for line-protection purposes, the apparatus comprising:
  an assembly having a first section, a second section, and means for holding the first and second sections together;
  said first and second sections cooperating to form an elongated finger-portion-supporting cross-piece portion of the assembly that extends along an axis of elongation; and
  said first and second sections cooperating to form a plurality of at least three line-gripping finger portions of the assembly each having generally planar opposite surfaces that extend away from the elongated finger-portion-supporting cross-piece) portion in a common direction and in spaced-apart relationship to each other, including a first line-gripping finger portion that defines a first line-receiving opening extending along a first central axis, a second line-gripping finger portion that defines a second line-receiving opening extending along a second central axis, and a third line-gripping finger portion that defines a third line-receiving opening extending along a third central axis;
  wherein the first, second, and third central axes extend intermediate the first and second sections generally parallel to the axis of elongation;
  thereby providing an apparatus having downwardly depending, spaced apart finger portions that define three sidewardly extending openings for receiving upwardly disposed and sidewardly extending loop portions of the plurality of at least three rearwardly extending coiled lines without subjecting the coiled lines to damage caused by rubbing against structure disposed intermediate the sidewardly extending openings.

9. An apparatus as recited in claim 8, wherein the means for holding the first and second sections together includes a plurality of nut-and-bolt combinations extending through the first and second sections.

10. An apparatus as recited in claim 8, further comprising means for connecting the assembly to a separate supportive spring.

11. An apparatus as recited in claim 10, wherein the means for connecting the assembly to a separate supportive spring includes a portion of the elongated finger-portion-supporting cross-piece portion that forms a loop on which a user can hook the spring.

12. An apparatus as recited in claim 8, wherein the first and second sections are composed of metal.

13. An apparatus as recited in claim 8, wherein the first and second sections are composed of plastic.

\* \* \* \* \*